United States Patent
Paquet

(10) Patent No.: US 11,097,193 B2
(45) Date of Patent: Aug. 24, 2021

(54) METHODS AND SYSTEMS FOR INCREASING PLAYER ENGAGEMENT IN MULTIPLAYER GAMING ENVIRONMENTS

(71) Applicant: Activision Publishing, Inc., Santa Monica, CA (US)

(72) Inventor: Philippe Louis Yves Paquet, Beverly Hills, CA (US)

(73) Assignee: Activision Publishing, Inc., Santa Monica, CA (US)

(*) Notice: Subject to any disclaimer, the term of this patent is extended or adjusted under 35 U.S.C. 154(b) by 0 days.

(21) Appl. No.: 17/019,070

(22) Filed: Sep. 11, 2020

(65) Prior Publication Data

US 2021/0069597 A1 Mar. 11, 2021

Related U.S. Application Data

(60) Provisional application No. 62/899,062, filed on Sep. 11, 2019.

(51) Int. Cl.
*A63F 13/79* (2014.01)
*A63F 13/537* (2014.01)
*A63F 13/795* (2014.01)
*A63F 13/69* (2014.01)
*G06Q 30/02* (2012.01)

(52) U.S. Cl.
CPC ............ *A63F 13/79* (2014.09); *A63F 13/537* (2014.09); *A63F 13/69* (2014.09); *A63F 13/795* (2014.09); *G06Q 30/02* (2013.01); *G06Q 30/0209* (2013.01)

(58) Field of Classification Search
None
See application file for complete search history.

(56) References Cited

U.S. PATENT DOCUMENTS

| 4,461,301 A | 7/1984 | Ochs |
| 4,908,761 A | 3/1990 | Tai |
| 5,031,089 A | 7/1991 | Liu |

(Continued)

FOREIGN PATENT DOCUMENTS

| AU | 768367 | 3/2004 |
| AU | 2005215048 | 10/2011 |

(Continued)

OTHER PUBLICATIONS

K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

(Continued)

*Primary Examiner* — Jason T Yen
(74) *Attorney, Agent, or Firm* — Novel IP

(57) ABSTRACT

The present specification describes computer-implemented methods and systems for simulating a multiplayer game environment to allow, and encourage, players to invite their social contacts to play the multiplayer game. Players are rewarded for each contact that engages with the multiplayer game in response to the invitation. Players are also rewarded for contacts invited by the invited contacts of the players that engage with the multiplayer game.

20 Claims, 6 Drawing Sheets

(56) References Cited

U.S. PATENT DOCUMENTS

| | | |
|---|---|---|
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |

(56) References Cited

U.S. PATENT DOCUMENTS

| | | |
|---|---|---|
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,997,987 B2 | 8/2011 | Johnson |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |

(56) References Cited

U.S. PATENT DOCUMENTS

| | | |
|---|---|---|
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,489,925 B1 | 7/2013 | Antukh |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 2001/0025253 A1* | 9/2001 | Heintz ............... G06Q 30/0222 705/14.23 |
| 2001/0032240 A1 | 10/2001 | Malone |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |

(56) References Cited

U.S. PATENT DOCUMENTS

| | | |
|---|---|---|
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0088233 A1 | 4/2009 | O'Rourke |
| 2009/0113448 A1 | 4/2009 | Smith |
| 2009/0137320 A1 | 5/2009 | Kimura |
| 2009/0253494 A1 | 10/2009 | Fitch |
| 2009/0325711 A1 | 12/2009 | Bronstein |
| 2010/0203963 A1* | 8/2010 | Allen .............. G07F 17/3218 463/30 |
| 2010/0304839 A1 | 12/2010 | Johnson |
| 2010/0306672 A1 | 12/2010 | McEniry |
| 2011/0131085 A1* | 6/2011 | Wey ............... G06Q 30/0214 705/14.16 |
| 2011/0190063 A1 | 8/2011 | Kajii |
| 2011/0212762 A1* | 9/2011 | Ocko ............... A63F 13/85 463/25 |
| 2012/0009997 A1 | 1/2012 | Youm |
| 2012/0010734 A1 | 1/2012 | Youm |
| 2012/0015736 A1* | 1/2012 | Vanbragt ........... A63F 13/85 463/42 |
| 2012/0021823 A1 | 1/2012 | Youm |
| 2012/0021825 A1 | 1/2012 | Harp |
| 2012/0064968 A1 | 3/2012 | Youm |
| 2012/0122552 A1 | 5/2012 | Youm |
| 2012/0315993 A1* | 12/2012 | Dumont .......... G07F 17/3225 463/42 |
| 2013/0225260 A1 | 8/2013 | Cudak |
| 2013/0252737 A1 | 9/2013 | Mescon |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0024445 A1* | 1/2014 | Aller .............. G07F 17/3276 463/29 |
| 2014/0162763 A1 | 6/2014 | Kim |
| 2014/0162781 A1 | 6/2014 | Butler |
| 2014/0274402 A1 | 9/2014 | Michel |
| 2014/0344725 A1 | 11/2014 | Bates |
| 2014/0349753 A1 | 11/2014 | Imai |
| 2015/0031426 A1 | 1/2015 | Alloway |
| 2015/0038233 A1 | 2/2015 | Rom |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0191671 A1 | 6/2016 | Dawson |
| 2016/0296840 A1 | 10/2016 | Kaewell |
| 2018/0169515 A1 | 6/2018 | Rice |
| 2018/0280806 A1* | 10/2018 | Otomo ............ A63F 13/35 |
| 2019/0081848 A1 | 3/2019 | Zou |
| 2019/0126150 A1* | 5/2019 | Tartaj ............. A63F 13/5372 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |

(56) References Cited

FOREIGN PATENT DOCUMENTS

| | | |
|---|---|---|
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1996 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

"Universally Unique Identifier", 2006 (http://en.wikipedia.org/wiki/UUID).

E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.

Roaming Virtual World Is a Real Trip; [Final Edition] Leslie Walker. The Washington Post. Washington, D.C.: Mar. 30, 2006.

Lee et al., "A Self-Adjusting Data Distribution Mechanism for Multidimensional Load Balancing in Multiprocessor-Based Database Systems," Information Systems vol. 19, No. 7, pp. 549-567, 1994.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

IBM, Transcoding: Extending e-business to new environments, Britton et al., Sep. 22, 2000.

IBM developer Works, OptimalGrid—autonomic computing on the Grid, James H. Kaufman; Tobin J. Lehman; Glenn Deen; and John Thomas, Jun. 2003.

International Search Report as Published as WO2005/079538 in corresponding international application No. PCT/US2005/005550, dated Jul. 5, 2006.

Feldman, R. "Mining unstructured data". Tutorial notes for ACK SIGKDD 1999. ACM Press. 182-236.

Wang, Y. "Web Mining and Knowledge Discovery of Usage Patterns". C5748T Project (Part I) Feb. 2000.

Sack, W. "Conversation Map: a content-based Usenet newsgroup browser". Proceedings of the 2000 International Conference on Intelligent User Interfaces. ACM Press. 233-240.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Garton, L., C. Haythornthwaite, B. Wellman. "Studying on-line social networks in Doing Internet Research", Jun. 1997.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Qureshi, S. "Supporting electronic group processes: a social perspective". Proceedings of the 1995 ACM SIGCPR Conference on Supporting teams, groups, and learning inside the IS function. ACM Press. 24-34.

Wellman, B. "For a social network analysis of computer networks: a sociological perspective on collaborative work and virtual community". Proceedings of the 1996 conference on ACM SIGCPR/SIGMIS. 1-11.

Schwartz, M. F., D. C. M. Wood. "Discovering shared interests among people using graph analysis of global electronic mail traffic". Department of Computer Science, University of Colorado, Boulder CO. Oct. 1992.

Kautz, H., B. Selman, M. Shah.. "Referral Web: Combining Social Networks and Collaborative Filtering". Communications of the ACM, vol. 40, No. 3, Mar. 1997.

(56) References Cited

OTHER PUBLICATIONS

V. Stojanovic, "Virtual boutique—try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-803 vol. 2.

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

Hassen et al., "A Task-and Data-Parallel Programming Language Based on Shared Objects," ACM Transactions on Programming Languages and Systems, vol. 20, No. 6, Nov. 1998, pp. 1131-1170.

Ma et al., "A Scalable Parallel Cell-Projection Volume Rendering Algorithm for Three-Dimensional Unstructured Data", IEEE 1997, pp. 1-10.

Andert, "A Simulation of Dynamic Task Allocation in a Distributed Computer System," Proceedings of the 1987 Winter Simulation Conference, 1987, pp. 1-9.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

\* cited by examiner

METHODS AND SYSTEMS FOR INCREASING PLAYER ENGAGEMENT IN MULTIPLAYER GAMING ENVIRONMENTS

CROSS-REFERENCE

The present application relies on, for priority, U.S. Patent Provisional Application No. 62/899,062, titled "Methods and Systems for Increasing Player Engagement in Multiplayer Gaming Environments", and filed on Sep. 11, 2019, herein incorporated by reference in its entirety.

FIELD

The present specification discloses systems and methods for improving multiplayer gaming environments. More specifically, the present specification is related to increasing player engagement through gaming incentives within online multiplayer gaming environments.

BACKGROUND

Online gaming platforms enable social interactions between players who may or may not be known to each other. Multiplayer gaming environments often enable players to form teams and therefore foster virtual interaction while they play in the same gaming environment at the same time. Individuals can form partnerships and participate in play against the system via pre-programmed challenges and/or against another team of individuals, thereby allowing for either co-operative or competitive play. Each gameplay session may be played with either the same or a different group of matched players.

With respect to team formation or opponent matching itself, different types of matchmaking processes are utilized to connect players for online gaming sessions. Sometimes, players are able to use programs to refer their game(s) to their friends and contacts within their social network. Offering the ability to players to invite their friends enables flexibility in matchmaking, and an overall improved experience to the player by allowing them to play with the person(s) of their choice and providing rewards or incentives to do so.

Some gaming environments allow players to interact with each other, and virtual characters, via social networking platforms. These platforms provide a virtual space to connect with other players with common interests and profiles related to certain gaming environments, are used by the players to discuss their gaming activities and experiences, and often provide a way for players to invite other potential players to play with them. There is a need for a gaming system and environment that may identify and incentivize players who are actively engaging additional players through invitations to play the game.

SUMMARY

The following embodiments and aspects thereof are described and illustrated in conjunction with systems, tools and methods, which are meant to be exemplary and illustrative, not limiting in scope.

In some embodiments, the present specification discloses a computer-implemented method for simulating a multiplayer game environment in a game session for multiple players where at least a first player of the multiple players has one or more contacts in a virtual social group, the method being implemented in a computer having a processor and a random access memory, wherein the processor is in data communication with a display and with a storage unit, the method comprising: generating a graphical user interface to be displayed to the first player, wherein the graphical user interface is configured to visually provide, on the display, a visual interface for inviting at least one contact from the one or more contacts in the social group to play the game session; receiving invitation data from the first player, wherein the invitation data is specific to the at least one contact and representative of a visual invitation to play the game session; transmitting the invitation data to the at least one contact; tracking an engagement of the at least one contact with the game session in response to the transmitted invitation data; modifying a data structure, associated with the first player, to reflect a value indicative of the engagement of the at least one contact with the game session; and generating, by the computer, a first reward for the first player corresponding to the value indicative of the engagement of the at least one contact with the game session.

Optionally, the engagement comprises logging into the game session by the at least one contact.

Optionally, the engagement comprises playing in the game session by controlling a virtual character for a predefined period of time by the at least one contact.

Optionally, at least one contact comprises two or more separate players.

Optionally, the tracking further comprises tracking an engagement of one or more further invited contacts, with the multiplayer game, in response to invites sent by the at least one contact invited by the first player.

Optionally, the method further comprises generating a second graphical user interface to be displayed to the at least one contact, wherein the second graphical user interface is configured to visually provide a second visual interface for inviting a third player who is associated with the at least one contact; receiving second invitation data from the at least one contact, wherein the second invitation data is specific to the third player and representative of a visual invitation to play the game session; transmitting the second invitation data to the third player; tracking an engagement of the third player with the game session in response to the transmitted second invitation data; modifying the data structure, associated with the first player, to reflect a value indicative of the engagement of the third player with the game session; and generating, by the computer, a second reward for the first player corresponding to the value indicative of the engagement of the third player with the game session.

Optionally, the first reward and the second reward are in-game virtual benefits comprising at least one of points, health, treasure, coins, levels, weapons, clothing, costumes, or accessories.

Optionally, the first reward and second reward are equal.

Optionally, the first reward has a greater value than the second reward.

Optionally, the method further comprises modifying a data structure, associated with the at least one contact, to reflect a value indicative of the engagement of the third player with the game session; and generating, by the computer, a reward for the at least one contact corresponding to the value indicative of the engagement of the third player with the game session.

Optionally, the method further comprises generating a third graphical user interface to be displayed to the third player, wherein the third graphical user interface is configured to visually provide a second visual interface for inviting a fourth player who is associated with the third player; receiving third invitation data from the third player, wherein the third invitation data is specific to the fourth player and representative of a visual invitation to play the game session; transmitting the third invitation data to the fourth player; tracking an engagement of the fourth player with the game session in response to the transmitted third invitation data; modifying the data structure, associated with the first player, to reflect a value indicative of the engagement of the fourth player with the game session; and generating, by the computer, a third reward for the first player corresponding to the value indicative of the engagement of the fourth player with the game session.

Optionally, the first reward, the second reward and the third reward are in-game virtual benefits comprising at least one of points, health, treasure, coins, levels, weapons, clothing, costumes, or accessories.

Optionally, the first reward, the second reward, and the third reward are equal.

Optionally, the first reward has a greater value than the second reward or the third reward.

Optionally, the first reward and the second reward has a greater value than the third reward.

Optionally, the method further comprises modifying a data structure, associated with the at least one contact, to reflect a value indicative of the engagement of the fourth player with the game session; and generating, by the computer, a reward for the at least one contact corresponding to the value indicative of the engagement of the fourth player with the game session.

Optionally, the method further comprises modifying a data structure, associated with the third player, to reflect a value indicative of the engagement of the fourth player with the game session; and generating, by the computer, a reward for the third player corresponding to the value indicative of the engagement of the fourth player with the game session.

In some embodiments, the present specification discloses a computer-implemented method for simulating a multi-player game environment in a game session for multiple players where at least a first player of the multiple players has one or more contacts in a virtual social group, the method being implemented in a computer having a processor and a random access memory, wherein the processor is in data communication with a display and with a storage unit, the method comprising: generating a graphical user interface to be displayed to the first player, wherein the graphical user interface is configured to visually provide, on the display, a visual interface for inviting a second player from the one or more contacts to play the game session; receiving invitation data from the first player, wherein the invitation data is specific to the second player and representative of a visual invitation to play the game session; transmitting the invitation data to the second player; tracking an engagement of the second player with the game session in response to the transmitted invitation data, wherein the engagement comprises the second player playing in the game session by controlling a virtual character for at least a predefined period of time; in response to said tracking, modifying a data structure, associated with the first player, to reflect a value indicative of the engagement of the second player with the game session; and generating, by the computer, a first reward for the first player corresponding to the value indicative of the engagement of the second player with the game session.

Optionally, the method further comprises generating a second graphical user interface to be displayed to the second player, wherein the second graphical user interface is configured to visually provide a second visual interface for inviting a third player; receiving second invitation data from the second player, wherein the second invitation data is specific to the third player and representative of a visual invitation to play the game session; transmitting the second invitation data to the third player; tracking an engagement of the third player with the game session in response to the transmitted second invitation data, wherein the engagement comprises the second player playing in the game session by controlling a virtual character for at least a predefined period of time; in response to said tracking, modifying the data structure, associated with the first player, to reflect a first value indicative of the engagement of the third player with the game session; in response to said tracking, modifying a data structure, associated with the second player, to reflect a second value indicative of the engagement of the third player with the game session; and generating, by the computer, a second reward for the first player corresponding to the first value indicative of the engagement of the third player with the game session and a third reward for the second player corresponding to the second value indicative of the engagement of the third player with the game session.

Optionally, the first reward and the second reward are in-game virtual benefits comprising at least one of points, health, treasure, coins, levels, weapons, clothing, costumes, or accessories.

Optionally, the first reward and second reward are equal.

Optionally, the first reward has a greater value than the second reward.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

Figure 1A:
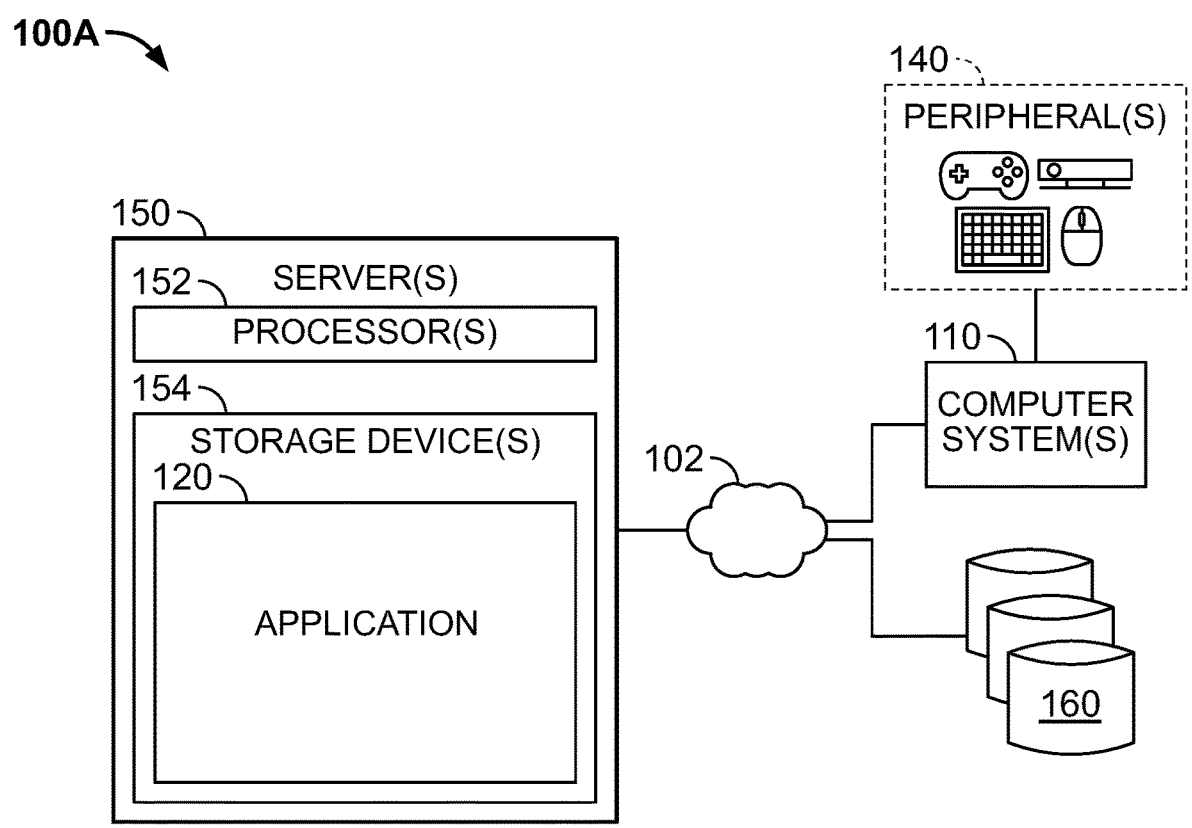
FIG. 1A is a block diagram of a system for providing multiplayer video games, according to one implementation of the present specification.

The present specification relates to dynamically providing incentives to a first player for inviting one or more additional players to a game, who join the game through the first player's invitation. Furthermore, if a second player is successfully invited to the game by the first player, and the second player further successfully invites one or more other players to the game, additional rewards and/or incentives are provided to the first player and rewards are also provided to the second player. Therefore, a hierarchy of rewards is formed with each successfully invited player. The systems and methods of the present specification may release the rewards at one or more instances of when an invited player accepts the invitation, when a player creates a gaming profile and/or activates the gaming profile, or when the successfully invited player(s) have played the game for a certain minimum amount of time or for any other pre-defined threshold, or any other occasion, which is predetermined by the game developer.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

The embodiments disclosed herein are directed to an improvement in computer-related technology (enabling computers to enable improved gaming experiences in an online multiplayer gaming environment), and thus do not recite abstract ideas or concepts. The improved computing gaming experiences are achieved through the use of specific rules to collect and evaluate player data within the gaming environment which, when executed, enable the automation of specific content generation, player matching, and other gaming experiences that previously were not available or could not be automated. These new computer gaming rules improve existing technological processes in gaming and, therefore, are not abstract or conceptual in nature. This specification therefore teaches how the disclosed inventions improve a gaming technology using a specific set of rules, and particular solutions to the aforementioned failures in conventional gaming systems to achieve the desired outcomes.

While aspects of the present specification may be described herein with reference to various game levels or modes, characters, roles, game items, etc. associated with a First-Person-Shooter (FPS) game, it should be appreciated that any such examples are for illustrative purposes only, and are not intended to be limiting. The matchmaking system and method described in detail herein may be used in any genre of multiplayer video game, without limitation.

The terminology used within this specification and detailed description of the various embodiments is for the purpose of describing particular embodiments only and is not intended to limit the invention.

As used herein, the term "a degree of" may be construed to mean a measure calculated by a processing device to a certain parameter, and used to assist in inferring an extent of that parameter.

The term "generating rewards" may be construed to mean a technical process of using a processor to change data entries which are used by the processor of a gaming console or gaming server in the process of programmatically generating valuable in-game benefits for a player within a gameplay session, which may include receiving extra points, health, treasure, virtual currency, weaponry, clothing, accessories, tokens, icons, access to restricted levels, bonus play, or other benefits.

In embodiments, a "successful invitation" may be construed to mean an invitation which has been accepted by a player when invited by another player, thereby resulting in the player actually playing the game.

The term "a multiplayer game environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multiplayer game environment or massively multiplayer online game is a computer-related technology, a non-generic technological environment, and should not be abstractly considered a generic method of organizing human activity divorced from its specific technology environment.

Exemplary System Architecture

Figure 1B:
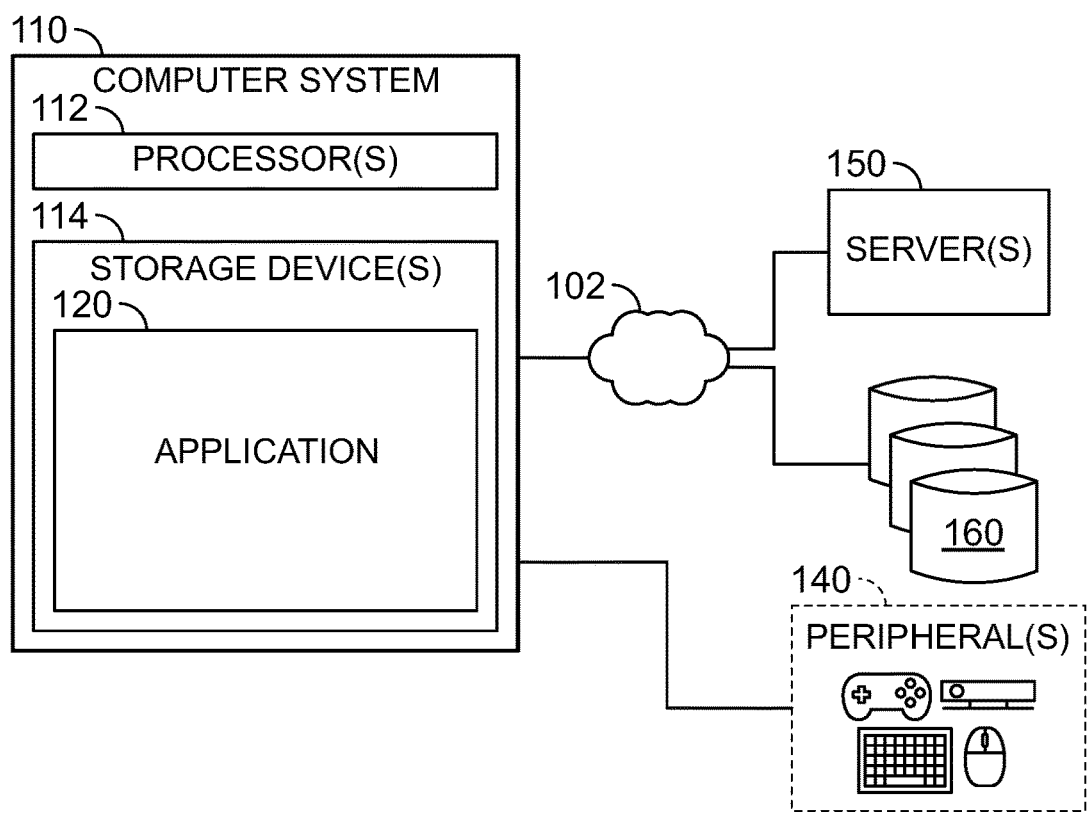
FIG. 1B is a block diagram of another system for providing multiplayer video games, according to one implementation of the present specification.

FIGS. 1A and 1B illustrate systems for providing multiplayer video games, according to some implementations of the present specification, referred to as a multiplayer game environment or multiplayer gaming environment. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

System 100 may be used to implement various embodiments described in subsequent sections of the present specification. For example, system 100 may implement various programs that result in greater performance by the players, better satisfaction with the play experience irrespective of the level of skill, result in greater satisfaction/enjoyment by the players, and/or otherwise will lead to positive gameplay outcomes for the players. In one implementation, system 100 may include one or more computer systems 110, one or more servers 150, one or more databases 160, and/or other components.

Computer system 110 may be configured as a gaming console, a handheld gaming device, a personal computer (e.g., a desktop computer, a laptop computer, etc.), a smartphone, a tablet computing device, a smart television, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store one or more applications 120), one or more peripherals 140, and/or other components. Processors 112 may be programmed by one or more computer program instructions. For example, processors 112 may be programmed by application 120 and/or other instructions (such as gaming instructions used to instantiate the game).

Depending on the system configuration, application 120 (or portions thereof) may be part of a game application, which creates a game instance to facilitate gameplay. Alternatively or additionally, application 120 may run on a device such as a server 150 to perform its designated function(s) for users in an "online" game hosted by server 150.

Application 120 may include instructions that program computer system 110, each of which are described in greater detail herein. As used herein, for convenience, the various instructions will be described as performing an operation, when, in fact, the various instructions program the processors 112 (and therefore computer system 110) to perform the operation.

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from and/or relating to a player. Peripherals 140 may be coupled to a corresponding computer system 110 via a wired and/or wireless connection.

Server 150 may include one or more computing devices. Referring back to FIG. 1A, Server 150 may include one or more physical processors 152 (also interchangeably referred to herein as processors 152, processor(s) 152, or processor 152 for convenience) programmed by computer program instructions, one or more storage devices 154 (which may store an application 120), and/or other components. Processors 152 may be programmed by one or more computer program instructions. For example, processors 152 may be programmed by gaming instructions used to instantiate the game.

Depending on the system configuration, application 120 (or portions thereof) may be part of a game application, which creates a game instance to facilitate gameplay. Alternatively, portions or all of application 120 may run on computer system 110 or server 150. Application 120 may include instructions that program server 150 to perform various operations, each of which are described in greater detail herein. As used herein, for convenience, the various instructions will be described as performing an operation, when, in fact, the various instructions program the processors 152 (and therefore server 150) to perform the operation.

Although illustrated in FIGS. 1A and 1B as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors (112, 152) may each include one or more physical processors that are programmed by computer program instructions. Thus, either or both server 150 and computer system 110 may function as a host computer programmed by application 120. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIGS. 1A and 1B as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

The various instructions described herein may be stored in a storage device (114, 154) which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
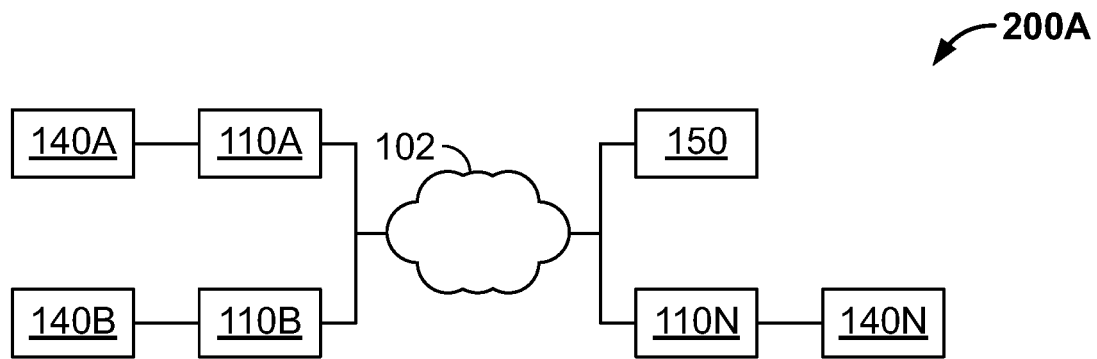
FIG. 2A illustrates an exemplary system configuration in which a server hosts a plurality of computer devices to facilitate a multiplayer game, according to an implementation of the present specification.

FIG. 2A illustrates an exemplary system configuration 200A in which a server hosts a plurality of computer devices to facilitate a multiplayer game, according to an implementation of the present specification. In one implementation, one or more servers 150 (illustrated in FIGS. 1A and 1B) may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of application 120 (illustrated in FIGS. 1A and 1B).

In some instances, a given server 150 may be associated with a proprietary gameplay network system, such as, without limitation, the Sony PlayStation® Network, Microsoft Xbox Live®, and/or any other gameplay network system. In this implementation, a given computer system 110 may be associated with a particular type of gaming console. Other types of computer systems 110 using other types of gameplay networks may be used as well.

Figure 2B:
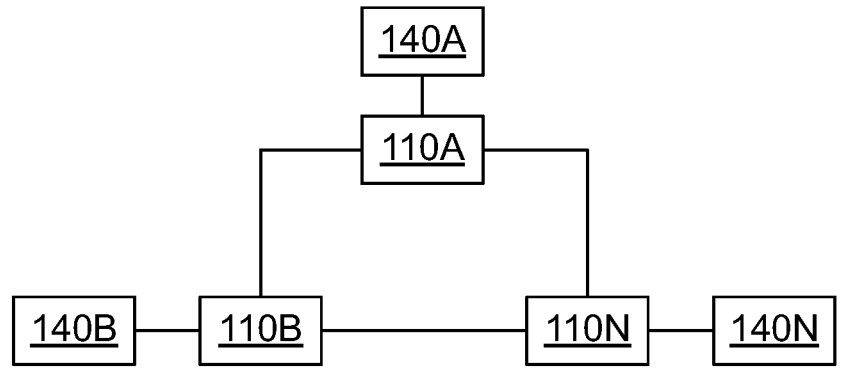
FIG. 2B illustrates an exemplary system configuration in which a plurality of computer systems are networked together to facilitate a multiplayer game, according to an implementation of the present specification.

FIG. 2B illustrates an exemplary system configuration 200B in which a plurality of computer systems 110 are networked together to facilitate a multiplayer game, according to an implementation of the present specification. Any one or more of the computer devices 110 may serve as a host and/or otherwise provide one or more operations of application 120 (illustrated in FIGS. 1A and 1B).

Figure 2C:
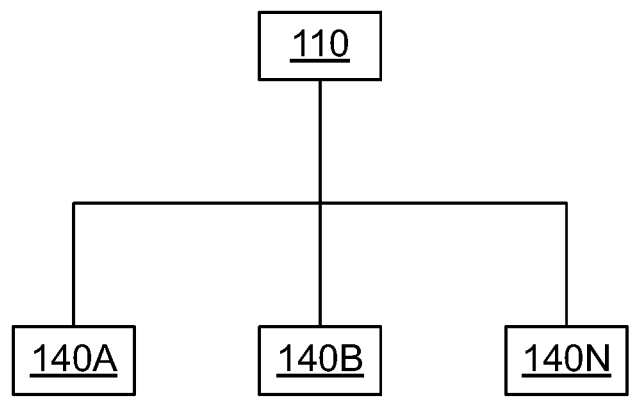
FIG. 2C illustrates an exemplary system configuration in which a computer system is used by a plurality of users to facilitate a multiplayer game, according to an implementation of the present specification.

FIG. 2C illustrates an exemplary system configuration 200C in which a computer system 110 is used by a plurality of users to facilitate a multiplayer game, according to an implementation of the present specification. In an implementation, computer system 110 may be considered to host the multiplayer game and/or otherwise provide one or more operations of application 120 (illustrated in FIGS. 1A and 1B).

Referring to FIGS. 2A-2C, simultaneously, in an implementation, a host may facilitate the multiplayer game by sending invitations to one or more contacts through social groups, to play the game and/or performing other operations described herein. In an implementation, at least some of these operations may also or instead be performed by one or more individual computer systems 110. Furthermore, the illustrated system configurations are exemplary only and should not be viewed as limiting in any way. Other system configurations may be used as well, as would be appreciated by those having skill in the art.

Data Structure and Engagement Methods

In an implementation of the present specification, application 120 enables players of a multiplayer game to actively engage other individuals, who may be online and are not concurrently playing the game. Application 120 may also enable the players to receive benefits for actively engaging the other individuals. The other individuals, referred to as potential players, may be other persons who are in contact with the players of the multiplayer game, through one or more social groups. In some embodiments, the engagement system is in the form of an invitation to play the game. Once an invitation is accepted by a recipient, the player sending the invitations is rewarded through the game.

Application Architecture

Figure 3:
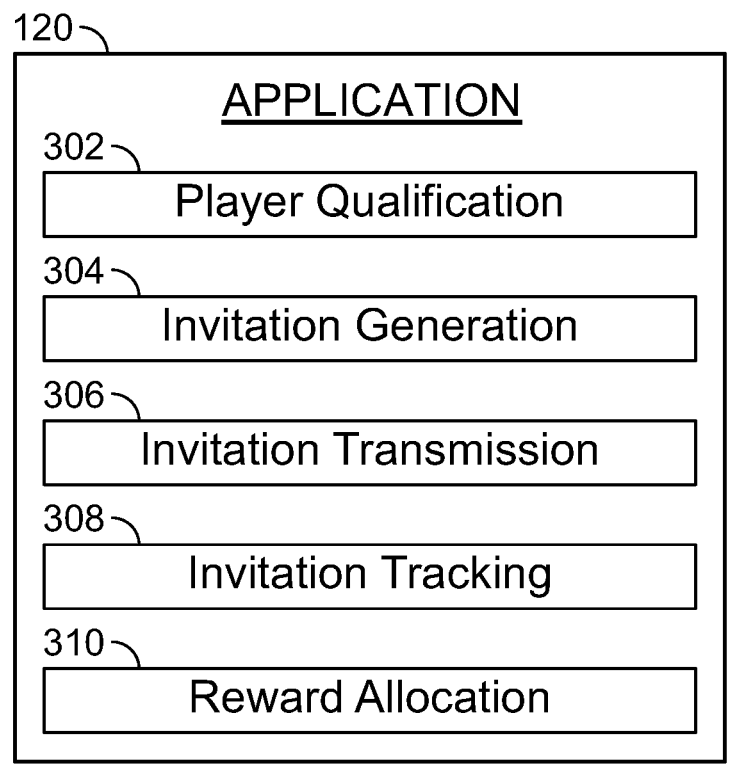
FIG. 3 illustrates an exemplary player engagement system, in accordance with some embodiments of the present specification.

FIG. 3 illustrates an exemplary set of modules implemented by application 120 described in the context of FIGS. 1A and 1B, in accordance with some embodiments of the present specification. In some embodiments, application 120 provides or implements a plurality of modules, such as, but not limited to a player qualification module 302, an invitation generation module 304, an invitation transmission module 306, an invitation tracking module 308, and a reward allocation module 310. It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game and business database system 160, and executed by a processor.

In some embodiments, module 302 is configured to access a data structure associated with a player, analyze a plurality of fields in the data structure, and depending on the analysis, qualify the player to send gaming invitations in exchange for rewards. The data structure provides a specialized and organized format for presenting, processing, retrieving, and storing data associated with each player. In some embodiments, the data structure is derived from a game log corresponding to the player. An analysis of the data structure may qualify the players to invite others. The qualified players may include those who have initiated engagement with the game or who are waiting in a virtual game lobby associated with the game. A player may be engaged in gameplay at a client device, such as computer system 110 with peripherals 140. Accordingly, the data structure associated with a player comprises values in data fields wherein the values are indicative of 1) the player having played a predetermined amount of games, times, total time played, hours, or total hours played and/or 2) the player having achieved a predefined level, amount of points, amount of treasure, or other virtual tokens within the multi-player online game and module 302 analyzes the data structure to determine if one or more of the values of the data fields qualify the player to have access to a graphical user interface through which invitations in exchange for rewards may be made. In embodiments, a value of the predetermined amount of games played, times, time played, hours, or total hours played may be reflective of a value within a particular game or in a player's gaming career.

Figure 5:
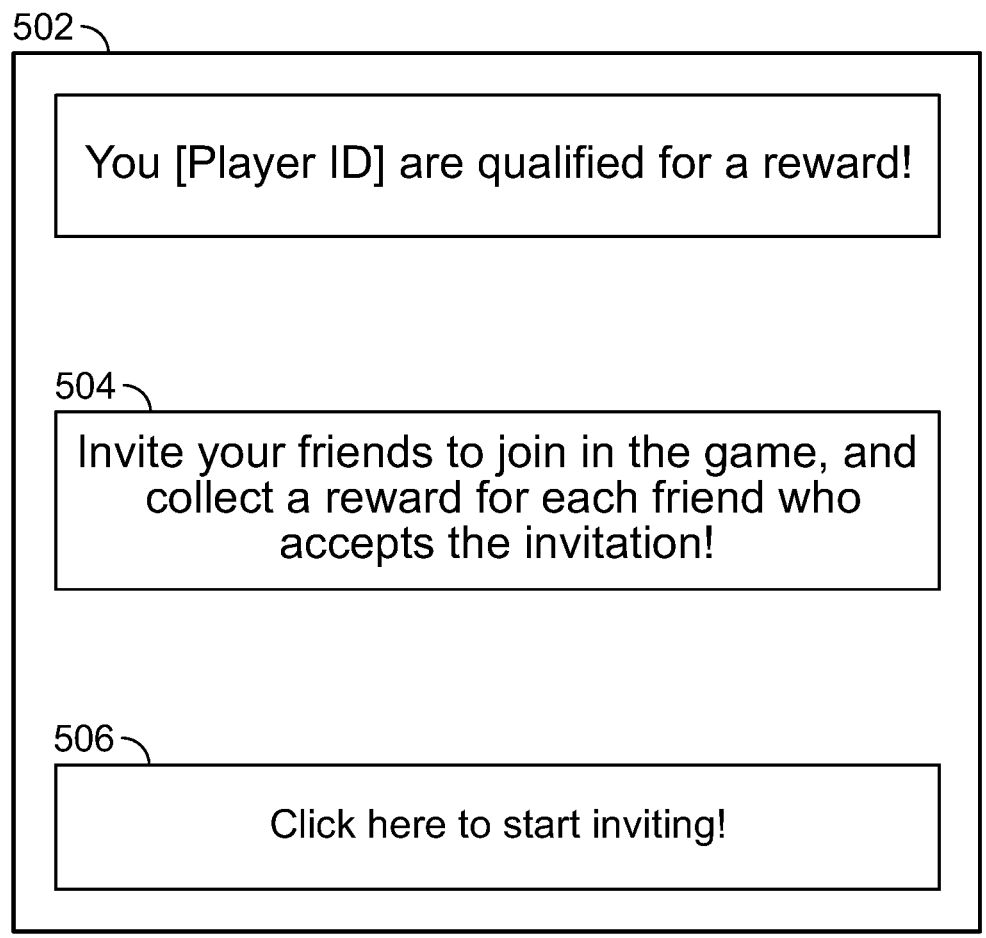
FIG. 5 is representation of an exemplary invitation on a graphical user interface, in accordance with an embodiment of the present specification.

In some embodiments, module 304 is configured to generate data representative of an invitation Graphical User Interface (GUI) once module 302 determines a player is qualified to receive the GUI. The data representing the user interface for inviting other players is generated for qualified players, identified by module 302. Further, the data representative of the invitation GUI is transmitted to the client device associated with the qualified player, for display to the player. In some embodiments, the data representative of the invitation GUI comprises at least one of text, graphics, and audio, which inform the qualified player about the option of inviting other players to the game and of receiving rewards in return. FIG. 5 illustrates an exemplary invitation GUI 502 displayed to a qualified player, in accordance with some embodiments of the present specification. GUI 502 comprises text 504 that informs the player of her/his qualification to collect rewards by inviting friends to join the player in the game. A button 506 is provided within GUI 502, which may be clicked or selected by other means (such as a touchscreen or gaming controller) by the qualified player to start inviting others by providing their contact information.

In embodiments, the data representative of the invitation GUI is designed to attract the player's attention, so that the player may consider exercising the presented option by choosing to invite others. In embodiments, the user interface enables the qualified player to provide contact information to enable the application 102 to contact other players that the qualified player chooses to invite. In some embodiments, the user interface asks for a selection of social media contacts of the qualified player that are to be invited. In some embodiments, the user interface asks for the qualified player to provide email address or any other identity (ID) of other potential players that the qualified player may want to invite. In different embodiments, the user interface is configured to prompt for different types of information to enable the application to establish contact with the qualified player's invitees. Module 304 associates an invitation ID with the invitation generated for the player, with the player's ID.

In some embodiments, a player may send invitations to friends using a user interface, such as GUI 502, that is presented in a duration when the game is about to begin, when the game is paused by the player, or at any other time including when the player is waiting in a game lobby to start playing the game. In embodiments, the player is able to send the invitation to friends who are connected to the player through one or more social mediums, such as social groups. The players may send the invitation to friends who appear to be online as well as those who appear to be offline.

In some embodiments, once the qualified player has interacted with the user interface asking the player to invite others, and if the player has chosen to invite at least one other player, module 306 transmits data representative of an invitation. Further, module 306 associates an invitation ID with an ID of the qualified player in the data structure. Module 306 associates the invitation ID of the player with the ID of the invited player/s, within the data structure associated with the qualified (inviting) player as well as those of the invited player/s. In some embodiments, it may happen that an invited player receives invitations from multiple inviting players. In this case, association between the invitation IDs of each inviting player with the invited player, within their corresponding data structures, is used to determine which, if any, invitation the invited player chooses to accept. The determination is subsequently useful in identifying a true claimant of the reward linked with successful acceptance of the invitation.

Recipients of the invitations from the qualified player may interact with the invite to either accept or decline the invitation. The received invite may be in the form of an interactive user interface enabling the receiver to interact with the invite to either accept or decline/ignore the invitation. Based on the invited player's interaction with the invitation, module 308 is configured to associate the invitation ID with the ID of the accepting invitee, in the data structure. Therefore, module 308 is configured to also track the ID of the inviting player with the invitation ID as well as the ID of the successfully invited player. The associations determined by module 308 are used to determine the players deserving rewards for successfully inviting others as well as the magnitude of the rewards.

In some embodiments, the rewards are awarded to a player when the player successfully invites at least one other friend. This may be referred to herein as a first node. The player is further rewarded when the successfully invited friend from the first node, further successfully invites at least one other friend. This may be referred to herein as a second node. In this manner, the rewards are cumulatively added for the originally inviting player even when the player is no longer actively inviting friends at the first node. In some embodiments, the value or amount of rewards is the same, whereas in some other embodiments, the value or amount of rewards varies with each node of successfully invited friends. In some embodiments, the rewards decrease in value with an increase in nodes. In some embodiments, the rewards are generated for the inviting player up to a certain node of successfully invited friends. In one example, a player is rewarded up to the third node of successfully invited friends.

In some embodiments, module 310 is configured to analyze the data structure and associated invitation IDs to determine an appropriate reward(s). Table 1 illustrates an exemplary representation of the distribution of rewards at various nodes, in accordance with some embodiments of the present specification.

TABLE 1

| Players | Invitation Received from & Accepted | Reward Received on Accepting by Various Players | | |
| --- | --- | --- | --- | --- |
| | | Upon Accepting by Player B | Upon Accepting by Player C | Upon Accepting by Player D |
| A | — | 100 | 50 | 25 |
| B | A | — | 100 | 50 |
| C | B | — | — | 100 |
| D | C | — | — | — |

Referring to Table 1, in an exemplary process, a player A is engaged in gameplay. While the Player 'A' is waiting in the virtual game lobby of the game, the application qualifies 'A' for inviting other players to the game. The player is accordingly presented with a prompt to send an invitation to one or more friends. In the example, 'A' invites among other friends, a person 'B' who accepts the invitation from 'A'. The acceptance of invitation from 'A' by 'B' generates a reward worth 100 points for player 'A'. Further, once player 'B' is qualified, an invitation is sent, among others, to a player 'C' who accepts the invitation from 'B'. The acceptance of the invitation from 'B' by 'C' generates a reward worth 100 points for player 'B', and 50 points for player 'A'. Similarly, once player 'C' is qualified, an invitation is sent, among others, to a player 'D' who accepts the invitation from 'C'. The acceptance of the invitation from 'C' by 'D' generates a reward worth 100 points for player 'C', 50 points for player 'B', and 25 points for player 'A'. In some embodiments further successful invitations generated by player 'D' may not generate rewards for player 'A', but would generate rewards for players 'B' and 'C'.

It should further be appreciated that the data structure may further track, and the system may further require, an invitee to actually play the multiplayer video game by controlling one or more virtual characters for a minimum or predefined period of time, after which the designated reward may be allocated to the player who invited the invitee. As such, a reward is generated for an inviting player when an incoming player has signed up to play the game. In some embodiments, the reward is generated when the incoming player has started playing the game. In some embodiments, the reward is generated when the incoming player has played the game to a pre-defined level, or for a pre-defined period of time, or until a pre-defined set of game objectives is attained. A friend is successfully invited to the game when one or more of the above conditions of the contact joining the game, are met. In embodiments, module 308 also tracks a progress of game engagement for each successfully invited friend, and generates the corresponding rewards for the inviting player. Accordingly, the system may track the time played by each invitee and Table 1 may be further modified to require data fields that require an allocation of a reward only upon a predefined amount of playing time being achieved.

In embodiments, a computer-implemented method is used in a multiplayer gaming environment to monitor the social contacts of the player, the recipients of the invitations sent by the player, the successful invitations, and the rewards.

In an exemplary embodiment, the accumulated rewards are displayed to the corresponding player and are dynamically updated with each additional successful invitation.

In embodiments, a computer implemented method of integrating a social network into one or more gaming environments of a multi-player game is used to identify at least one social group comprising one or more contacts connected to the first player. A centralized social network tool may be provided that interfaces with and integrates into one or more gaming environments. In an embodiment, a central server communicates with multiple computing devices that provide the gaming environment to different players. In an embodiment, the centralized social network tool is implemented by the central server. The social network tool may be integral to the theme of the games and be pervasive within game play. In embodiments, members of the social network include friends of the first player and/or previous and current players of the game who are friends of the first player. In embodiments, the actual players represent real people.

Figure 4:
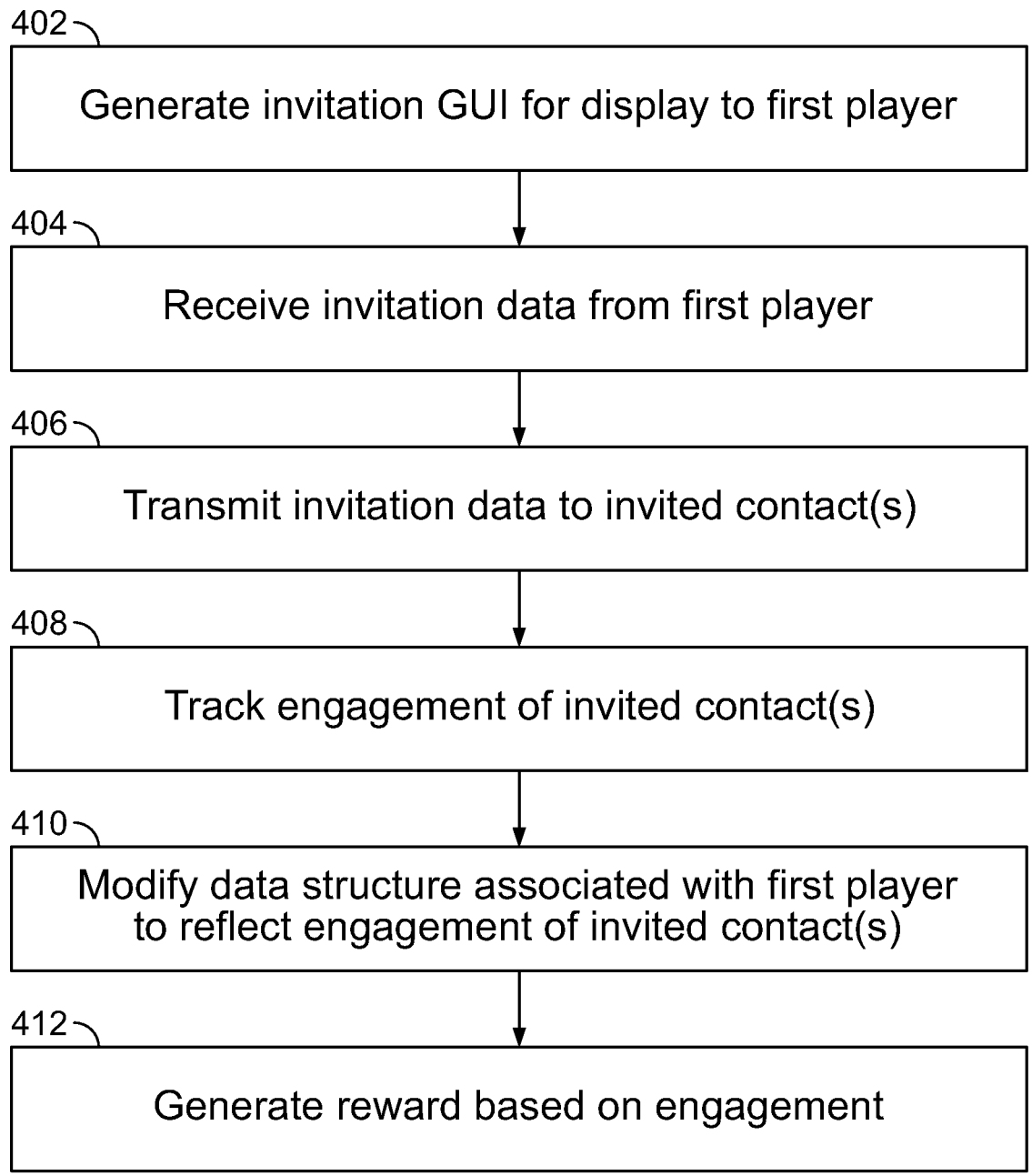
FIG. 4 is a flow chart illustrating an exemplary process of engaging other players, in accordance with some embodiments of the present specification.

FIG. 4 is a flow chart explaining an exemplary process implemented by some embodiments of the present specification. At 402, a GUI is generated for display to a first player who is engaged in a game session of a multiplayer game. The first player has one or more contacts in a virtual social group. In embodiments, the GUI is configured to visually provide, on the display, a visual interface for inviting at least one contact from the one or more contacts in the social group to join the first player in playing in the game session. FIG. 5 illustrates an exemplary GUI 502 that is displayed to the first player. In some embodiments, the user interface asks for a selection of social media contacts of the qualified player that are to be invited. In some embodiments, the user interface asks for the qualified player to provide email address or any other identity (ID) of other potential players that the qualified player may want to invite. In different embodiments, the user interface is configured to prompt for different types of information to enable the application to establish contact with the qualified player's invitees. Data structure of the first player is accessed and associated with the generated invitation GUI. The data structure may also indicate the qualification of the first player for displaying the invitation GUI. The data representing the user interface for inviting other players is generated for qualified players.

The first player chooses to invite other players in response to the invitation GUI, and provides contact information of one or more contacts from the first player's social group. The first player may send invitations to friends who appear to be online as well as those who appear to be offline. The invitation data is received by the processor, which in turn may associate an invitation ID with the invitation generated for the invited player, with the invited player's ID, as well as the inviting first player's ID.

At 404, the invitations generated by the first player are received as invitation data. In embodiments, the invitation data is specific to the at least one contact and representative of a visual invitation to play the game session. At 406, the invitation data is transmitted to the at least one contact invited by the first player. The received invite may be in the form of an interactive user interface enabling the receiver to interact with the invite to either accept or decline/ignore the invitation. At 408, an engagement of each invited contact with the game session is tracked in response to the transmitted invitation data.

At 410, a data structure associated with the first player is modified to reflect a value indicative of the engagement of the at least one contact invited by the first player, with the game session. The associations determined are used to determine the rewards collected by the first player, for successfully inviting others, as well as the magnitude of the rewards. At 412, a first reward is generated for the first player corresponding to the value indicative of the engagement of the at least one invited contact with the game session. In embodiments, a reward is generated for the first player each time an invited contact successfully accepts the first player's invitation to join the game session. This may be referred to herein as a first node. In some embodiments, the rewards are awarded to a player when the player successfully invites at least one other friend. The player is further rewarded when the successfully invited friend from the first node, further successfully invites at least one other friend. This may be referred to herein as a second node. In this manner, the rewards are cumulatively added for the originally inviting player even when the player is no longer actively inviting friends at the first node. In some embodiments, the value or amount of rewards is the same, whereas in some other embodiments, the value or amount of rewards varies with each node of successfully invited friends. In some embodiments, the rewards decrease in value with an increase in the node. In some embodiments, the rewards are generated for the inviting player till a certain node of successfully invited friends. In one example, a player is rewarded till the third node of successfully invited friends. The data structure associations are used to determine an appropriate reward(s). In an exemplary embodiment, the accumulated rewards are displayed to the corresponding player and is dynamically updated with each additional successful invitation.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A computer-implemented method for simulating a multiplayer game environment in a game session for multiple players where at least a first player of the multiple players has one or more contacts in a virtual social group, the method being implemented in a computer having a processor and a random access memory, wherein the processor is in data communication with a display and with a storage unit, the method comprising:

generating, using an invitation generation module, a graphical user interface to be displayed to the first player, wherein the graphical user interface is configured to visually provide, on the display, a visual interface for inviting at least one contact from the one or more contacts in the social group to play the game session, and wherein the graphical user interface is displayed in the multiplayer game environment to the first player;

receiving, by the computer, invitation data from the first player, wherein the invitation data is specific to the at least one contact and representative of a visual invitation to play the game session;

transmitting, using an invitation transmission module, the invitation data to the at least one contact;

causing the invitation data to be displayed to the at least one contact;

tracking, using an invitation tracking module, an engagement of the at least one contact with the game session in response to the transmitted invitation data;

modifying, using the invitation tracking module, a data structure, associated with the first player, to reflect a value indicative of the engagement of the at least one contact with the game session;

generating, using a reward allocation module, a first reward for the first player corresponding to the value indicative of the engagement of the at least one contact with the game session;

generating, using the invitation generation module, a second graphical user interface to be displayed to the at least one contact, wherein the second graphical user interface is configured to visually provide a second visual interface for inviting a third player who is associated with the at least one contact, and wherein the second graphical user interface is displayed in the multiplayer game environment to the at least one contact;

receiving, by the computer, second invitation data from the at least one contact, wherein the second invitation data is specific to the third player and representative of a visual invitation to play the game session;

transmitting, using the invitation transmission module, the second invitation data to the third player;

causing the second invitation data to be displayed to the third player;

tracking, using an invitation tracking module, an engagement of the third player with the game session in response to the transmitted second invitation data;

modifying, using the invitation tracking module, the data structure, associated with the first player, to reflect a value indicative of the engagement of the third player with the game session; and generating, using the reward allocation module, a second reward for the first player corresponding to the value indicative of the engagement of the third player with the game session.

2. The computer-implemented method of claim 1, wherein the engagement comprises logging into the game session by the at least one contact.

3. The computer-implemented method of claim 1, wherein the engagement comprises playing in the game session by controlling a virtual character for a predefined period of time by the at least one contact.

4. The computer-implemented method of claim 1, the at least one contact comprises two or more separate players.

5. The computer-implemented method of claim 1, wherein the tracking further comprises tracking an engagement of one or more further invited contacts, with the multiplayer game, in response to invites sent by the at least one contact invited by the first player.

6. The computer-implemented method of claim 1 wherein the first reward and the second reward are in-game virtual benefits comprising at least one of points, health, treasure, coins, levels, weapons, clothing, costumes, or accessories.

7. The computer-implemented method of claim 6 wherein the first reward and second reward are equal.

8. The computer-implemented method claim 6 wherein the first reward has a greater value than the second reward.

9. The computer-implemented method of claim 1 further comprising:

modifying a data structure, associated with the at least one contact, to reflect a value indicative of the engagement of the third player with the game session; and generating, by the computer, a reward for the at least one contact corresponding to the value indicative of the engagement of the third player with the game session.

10. The computer-implemented method of claim 1 further comprising:

generating a third graphical user interface to be displayed to the third player, wherein the third graphical user interface is configured to visually provide a second visual interface for inviting a fourth player who is associated with the third player;

receiving third invitation data from the third player, wherein the third invitation data is specific to the fourth player and representative of a visual invitation to play the game session;

transmitting the third invitation data to the fourth player;

tracking an engagement of the fourth player with the game session in response to the transmitted third invitation data;

modifying the data structure, associated with the first player, to reflect a value indicative of the engagement of the fourth player with the game session; and generating, by the computer, a third reward for the first player corresponding to the value indicative of the engagement of the fourth player with the game session.

11. The computer-implemented method of claim 10 wherein the first reward, the second reward and the third reward are in-game virtual benefits comprising at least one of points, health, treasure, coins, levels, weapons, clothing, costumes, or accessories.

12. The computer-implemented method of claim 11 wherein the first reward, the second reward, and the third reward are equal.

13. The computer-implemented method claim 11 wherein the first reward has a greater value than the second reward or the third reward.

14. The computer-implemented method of claim 11 wherein the first reward and the second reward has a greater value than the third reward.

15. The computer-implemented method of claim 10 further comprising:

modifying a data structure, associated with the at least one contact, to reflect a value indicative of the engagement of the fourth player with the game session; and generating, by the computer, a reward for the at least one contact corresponding to the value indicative of the engagement of the fourth player with the game session.

16. The computer-implemented method of claim 10 further comprising:

modifying a data structure, associated with the third player, to reflect a value indicative of the engagement of the fourth player with the game session; and generating, by the computer, a reward for the third player corresponding to the value indicative of the engagement of the fourth player with the game session.

17. A computer-implemented method for simulating a multiplayer game environment in a game session for multiple players where at least a first player of the multiple players has one or more contacts in a virtual social group, the method being implemented in a computer having a processor and a random access memory, wherein the processor is in data communication with a display and with a storage unit, the method comprising:

generating, using an invitation generation module, a graphical user interface to be displayed to the first player, wherein the graphical user interface is configured to visually provide, on the display, a visual interface for inviting a second player from the one or more contacts to play the game session and wherein the graphical user interface is displayed in the multiplayer game environment to the first player;

receiving, by the computer, invitation data from the first player, wherein the invitation data is specific to the second player and representative of a visual invitation to play the game session;

transmitting, using an invitation transmission module, the invitation data to the second player;

causing the invitation data to be displayed to the second player;

tracking, using an invitation tracking module, an engagement of the second player with the game session in response to the transmitted invitation data, wherein the engagement comprises the second player playing in the game session by controlling a virtual character for at least a predefined period of time;

in response to said tracking, modifying, using the invitation tracking module, a data structure, associated with the first player, to reflect a value indicative of the engagement of the second player with the game session;

generating, using a reward allocation module, a first reward for the first player corresponding to the value indicative of the engagement of the second player with the game session;

generating, using the invitation generation module, a second graphical user interface to be displayed to the second player, wherein the second graphical user interface is configured to visually provide a second visual interface for inviting a third player;

receiving, by the computer, second invitation data from the second player, wherein the second invitation data is specific to the third player and representative of a visual invitation to play the game session;

transmitting, using the invitation transmission module, the second invitation data to the third player;

causing the second invitation data to be displayed to the third player;

tracking, using an invitation tracking module, an engagement of the third player with the game session in response to the transmitted second invitation data, wherein the engagement comprises the second player playing in the game session by controlling a virtual character for at least a predefined period of time;

in response to said tracking, modifying, using the invitation tracking module, the data structure, associated with the first player, to reflect a first value indicative of the engagement of the third player with the game session;

in response to said tracking, modifying, using the invitation tracking module, a data structure, associated with the second player, to reflect a second value indicative of the engagement of the third player with the game session; and generating, using the reward allocation module, a second reward for the first player corresponding to the first value indicative of the engagement of the third player with the game session and a third reward for the second player corresponding to the second value indicative of the engagement of the third player with the game session.

18. The computer-implemented method of claim 17 wherein the first reward and the second reward are in-game virtual benefits comprising at least one of points, health, treasure, coins, levels, weapons, clothing, costumes, or accessories.

19. The computer-implemented method of claim 18 wherein the first reward and second reward are equal.

20. The computer-implemented method claim 18 wherein the first reward has a greater value than the second reward.

* * * * *